May 26, 1970 N. D. LEVIN 3,514,208

APERTURE MASK INSPECTION APPARATUS

Filed Jan. 30, 1967

INVENTOR.
Nathan D. Levin
BY Nicholas A. Camasto
ATTY.

3,514,208
Patented May 26, 1970

3,514,208

APERTURE MASK INSPECTION APPARATUS

Nathan D. Levin, Highland Park, Ill., assignor to Admiral Corporation, Chicago, Ill., a corporation of Delaware Filed Jan. 30, 1967, Ser. No. 612,533
Int. Cl. G01b *11/26;* H01j *9/42*
U.S. Cl. 356—154 7 Claims

ABSTRACT OF THE DISCLOSURE

Apparatus for indicating the suitability of a mated aperture mask and face panel combination for assembly into a finished color television picture tube. A support table positions the mated aperture mask and face panel combination above a light source and collimator with a diffusing tip and an intermediate dispersion light diverging lens. Apparatus provides motion of light source and collimator with respect to lens and mask-panel combination to register and misregister light rays on a set of color phosphor dots on the face panel.

Figures 1, 2:
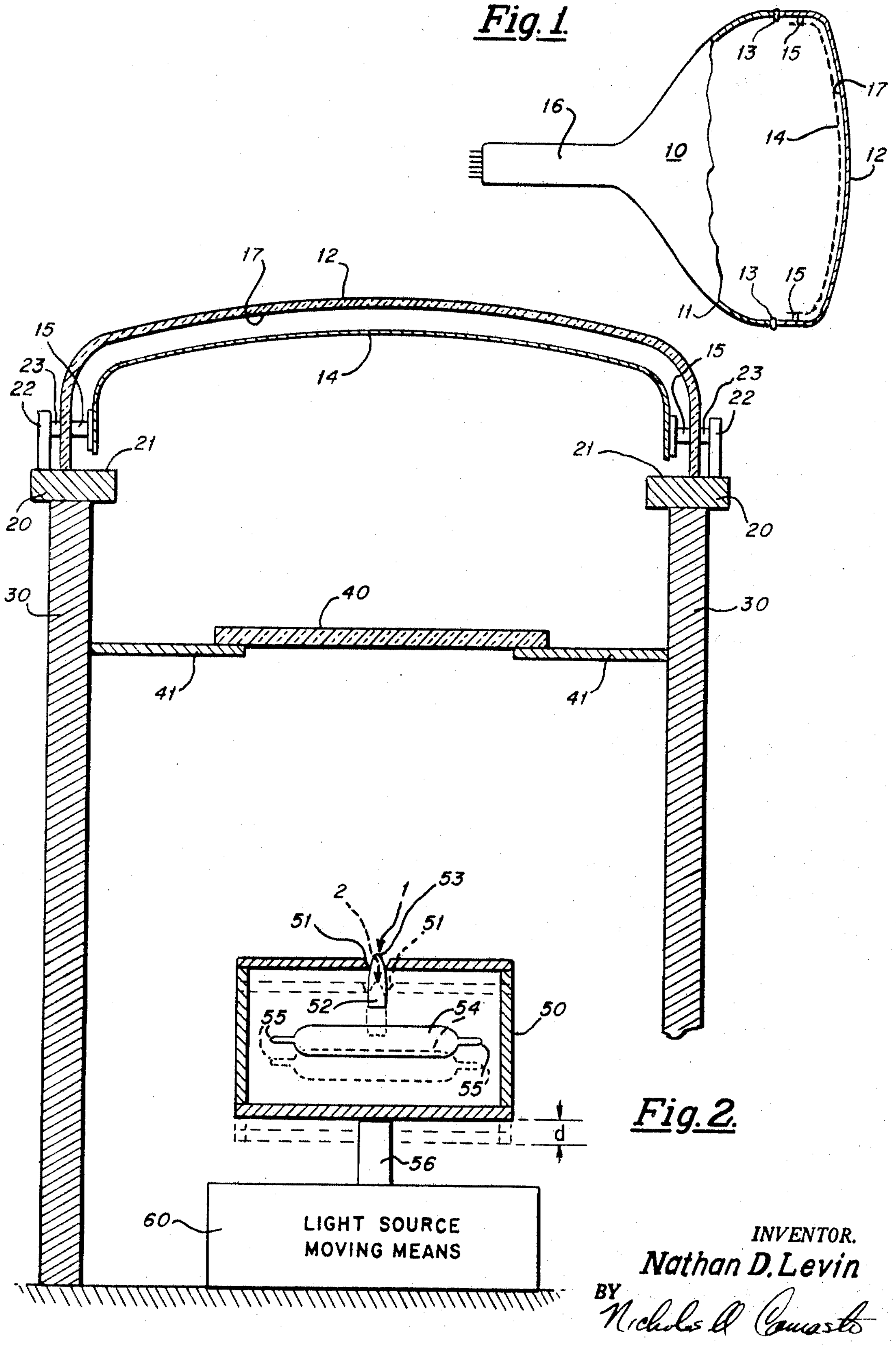

This invention relates in general to color television picture tubes and in particular to apparatus for providing a visual indication of the suitability of a mated aperture mask and face panel combination for assembly into a finished color television picture tube.

Color television picture tubes of the present day commercial variety generally comprise a glass envelope consisting of a separate face panel and funnel, a tricolor phosphor screen on the inner surface of the face panel, an aperture mask mounted in the face panel closely adjacent the phosphor screen, and a trio of electron guns mounted in the neck of the tube. It is appreciated by those familiar with the manufacture of color television picture tubes of this type, that the production of the picture tube face panel, the aperture mask, and the phosphor screen on the inside of the face panel are very critical aspects of the overall manufacturing process. In particular, the contour of the screen area of the face panel and the contour of the aperture mask are very accurately designed and must be manufactured with narrow tolerances. The aperture mask itself is usually made of relatively soft steel on the order of .006 inch in thickness. The mask is usually formed to the appropriate contour and then welded along its periphery to a rigid frame. Because of the thinness of the mask, it is highly susceptible to being dented, especially near the edges, while being handled during the manufacturing process.

The tricolor phosphor screen is usually developed on the inside of the face panel by a direct photographic process in which an individual aperture mask is mated with a particular face panel and employed as a negative to produce three sets of color phosphor dots on the face panel on a one-set-at-a-time basis. This portion of the manufacturing process requires that the aperture mask be inserted and removed from the face panel a number of times. A first set of phosphor dots is produced by forming a photosensitive film on the inner surface of the face panel, inserting an aperture mask, and then exposing the photosensitive film to a small area light source through the holes in the aperture mask. A particular type of color phosphor particles may be either integrated into the photosensitive film prior to exposure or placed thereon after exposure and developing. In any event, after the photosensitive film has been exposed through the aperture mask, the aperture mask is removed from the face panel, and the first set of phosphor dots is developed by washing off the unexposed areas of the photosensitive film. A second set of color phosphor dots is produced by again coating the face panel with a photosensitive film, placing the aperture mask in the face panel, and then exposing the photosensitive film to a small area light source through the aperture mask. The aperture mask is then removed a second time to allow the second set of phosphor dots to be developed in the same manner as the first.

This process is repeated until all three sets of phosphor dots are developed on the face panel so the aperture mask is mounted in place and removed a number of times. Subsequent operations, such as aluminizing the phosphor screen, etc., also require handling of the aperture mask separate from the face panel. Each time the aperture mask is handled, it is subject to the fortuitous production of deformities therein, particularly around the edges where the mask is likely to be touched during handling. Only a very slight amount of force is required to make a permanent dent in the aperture mask.

It is particularly serious when one of these dents or deformities is produced in the mask after the first of the three sets of color phosphor dots is developed on the face panel since a certain portion of subsequent sets of phosphor dots will be out of place with respect to the original set in an area on the phosphor screen which was exposed to the light source through the dented area of the aperture mask. If a mated aperture mask and face panel combination with a dented aperture mask finds its way into a finished color television picture tube, it will cause the finished tube to be rejected. A finished tube is produced by joining a funnel to the mated aperture mask and face panel combination, sealing an electron gun assembly into the neck of the picture tube, and then exhausting the glass envelope to a high degree of vacuum. If the finished tube proves to be defective due to a dent or other deformity in the aperture mask, the finishing steps have been accomplished in vain and a substantial loss has resulted, especially since the finished tube must then be subjected to an expensive and time consuming salvage operation to recover the relatively expensive glass face panel and funnel.

It is also possible that a particular aperture mask might be mismated with a face panel, i.e., mated with a face panel different from the one it was mated with during the production of the phosphor screen. In such a case, if the mismated aperture mask and face panel combination is assembled into a finished picture tube, a rejected finished tube will result. Moreover, such a mismating might trigger a whole sequence of mismating of aperture masks and face panels which would not be detected until a string of defects showed up in a final test of the picture tubes.

From the above discussion, it can easily be seen that it is highly desirable to be able to detect the suitability of a mated aperture mask and face panel combination for assembly into a finished color television picture tube and to eliminate from the finishing assembly line all combinations which involve a dented or otherwise defective aperture mask or a mismated mask and panel combination.

Therefore, it is the primary object of this invention to provide apparatus for determining the suitability of a mated aperture mask and face panel combination for assembly into a finished color television picture tube.

It is a further object of this invention to provide apparatus for producing a readily apparent visual indication of the suitability of a mated aperture mask and face panel combination for assembly into a finished color television picture tube.

In accordance with this invention apparatus is provided for alternately registering and misregistering light rays on substantially all of one of the sets of phosphor dots on a color picture tube face panel to produce visual indications on the phosphor screen of the proper or improper mating of an aperture mask and face panel and of the presence or absence of undesirable deformities in the aperture mask.

In accordance with a preferred embodiment of this invention, apparatus is provided to direct light rays through the aperture mask to the face panel where they impinge on the first-developed set of phosphor dots and then to alter the paths of the light rays with respect to the aperture mask in a predetermined recurrent manner to produce a visual indication on the phosphor screen of the presence or absence of any deformities created in the aperture mask subsequent to the development of the first set of phosphor dots.

Apparatus constructed in accordance with the preferred embodiment of this invention includes a panel support table with indexing means thereon for indexing a mated face panel and aperture mask combination in a predetermined position on the panel support table; a light producing assembly which includes a source of light rays and a collimator with a light diffusing tip for projecting a plurality of light rays towards the mated aperture mask and face panel combination; a lens assembly including a diverging lens and a lens holder located in a position intermediate the collimator and panel support table; and apparatus for moving the light producing assembly alternately away from and back to a first position to change the paths of the light rays with respect to the aperture mask. The lighthouse is designed and accurately aligned so that the light rays from the collimator tip, when it is in its first position, will be directed by the lens into paths which pass through the aperture mask and strike the first-developed set of phosphor dots on the face panel. When the collimator and light source are moved away from the first position to a second position and then back again in a periodically recurrent fashion, the light rays are alternately registered and misregistered on the first-developed set of phosphor dots. If a dent exists in the aperture mask, an alternating dark and light blotch will show up in an area of the phosphor screen corresponding to the location of the dent in the aperture mask. Of course, if the aperture mask and face panel are mismated, the light rays will not strike all of the phosphor dots of the first-developed set, and the motion of the light source and collimator will produce a pattern of moving dark and light blotches over all of the area of the phosphor screen.

The direction, period, and distance of motion of the light source and collimator are not particularly critical and values for these variables may be chosen to produce visual indications on the phosphor screen which are most readily apparent to an operator of the apparatus. It is, however, believed that motion of the light source and collimator perpendicular to the plane defined by the panel support table is the most efficient way of alternately registering and misregistering the light rays on the first-developed set of phosphor dots.

It is to be understood that the same results, that is, the same visual indications, can be produced by moving the lens in a recurrent manner or by moving the panel support table or the face panel itself, always keeping the remaining elements of the lighthouse fixed.

The advantage of being able easily to detect a mismated aperture mask and face panel combination and dents or other deformities in aperture masks prior to assembling them into a finished picture tube is obvious since the losses involved in assembling the components into a finished tube which will prove defective, together with the losses involved in salvaging the face panel and funnel of such a defective tube, can be eliminated by removing unsuitable aperture mask and face panel combinations from the finishing assembly line after detection thereof.

Other objects, features, and advantages of this invention will be apparent from a consideration of the following detailed description in conjunction with the accompanying drawing in which:

FIG. 1 is a partially-sectioned view of a color television picture tube of the present day commercial variety; and FIG. 2 is a schematic drawing of aperture mask inspection apparatus in accordance with this invention.

In FIG. 1 a color television picture tube 10 is shown as comprising a glass envelope or bulb consisting of a funnel 11 and a face panel 12, a tricolor phosphor screen on an inner surface 17 of face panel 12, an aperture mask 14, and a trio of electron guns (not shown) in neck 16 of picture tube 10. As shown, aperture mask 14 is mounted in face panel 12 closely adjacent the inner surface 17 thereof. The mounting of aperture mask 14 to face panel 12 may be accomplished by attaching the periphery of aperture mask 14 to a plurality of studs 15 on the skirt of face panel 12. Generally, the mounting of aperture mask 14 is accomplished in a manner such that the mask may be easily removed and replaced in the same position relative to face panel 12.

Face panel 12 is shown joined to funnel 11 by a frit seal 13. This joining of the face panel 12 and funnel 11 may be accomplished by any of the means known in the art, a common method being that of applying a band of glass sealing compound, or frit, around the circumference of one of the glass members; mating the face panel 12 and funnel 11 together; and then heating the assembly until the glass sealing compound 13 is hardened by devitrification. This process of joining the face panel 12 and funnel 11 to provide a complete glass enclosure takes place after the phosphor screen has been produced on the inner surface 17 of face panel 12. As has previously been discussed, aperture mask 14 is generally used as a negative in producing the tricolor phosphor screen on surface 17, and this process requires that aperture mask 14 be mounted in and removed from face panel 12 a number of times. During handling of aperture mask 14 it is possible that a dent will be produced therein since the mask is on the order of .006 inch in thickness and is supported only around its periphery. Only a very small amount of force, such as might be applied by a person's finger or by a slight contact with another object, is required to make a permanent dent in this thin mask.

If a dent is produced in aperture mask 14 subsequent to the production of the first set of phosphor dots on the inner surface 17 of face panel 12, and the aperture mask and face panel combination is subsequently assembled into a finished picture tube, this finished picture tube will be rejected in final testing thereof. The finishing portion of the manufacturing process includes the joining of face panel 12 to funnel 11, the sealing of an electron gun assembly into neck 16 of a picture tube 10, and the exhausting of the glass envelope to a high degree of vacuum. Thus, this finishing process contributes a substantial amount to the overall cost of producing a finished picture tube. If the finished tube proves defective due to an unsuitable aperture mask and face panel combination, a substantial loss has resulted. Moreover, face panel 12 and funnel 11 are relatively expensive components of the picture tube 10 so defective picture tubes are usually subjected to a salvage operation directed toward recovery of as many as possible of these face panels and funnels in acceptable condition.

From the above discussion it can easily be seen that it is highly desirable to be able to determine whether or not a particular aperture mask and face panel combination is suitable for assembly into a finished color television picture tube. The apparatus shown in FIG. 2 is designed to enable this to be determined in a very advantageous manner.

The inspection apparatus shown in FIG. 2 is similar to a picture tube lighthouse which is used in producing a set of color phosphor dots on a picture tube face panel. As such, the apparatus includes a support table 20, having a top planar surface 21, for supporting a picture tube face panel 17. Indexing blocks 22 having indexing studs 23 thereon are located on support table 20 to index face panel 17 in a predetermined position. Support table 20 is supported by a frame 30.

A diverging lens 40 is held in position below support table 20 by a lens holder 41 which is attached to frame 30. An enclosure 50 which may be constructed from metal or any other suitable material is located below lens 40 and contains a collimator 52 and a light source 54, such as an ultraviolet lamp. Diffusing tip 53 of collimator 52 projects through an aperture 51 in the top of enclosure 50. Light source 54 and collimator 52 may be supported in enclosure 50 in any suitable manner. End terminals 55 of light source 54 may be connected to a source of electrical potential (not shown) for the purpose of energizing the light source.

A light source moving means 60 is shown connected to enclosure 50 by a rod 56. The function of light source moving means 60 is to provide periodic reciprocating motion of metal enclosure 50 and its internal constituents through a preset distance *d*.

The operation of the aperture mask inspection apparatus described above is as follows. Light source 54, when energized, produces a plurality of light rays which are gathered by collimator 52 and projected from diffusing tip 53 of collimator 52 toward diverging lens 40. Lens 40 directs these light rays into paths through the apertures in aperture mask 14, striking the tricolor phosphor screen on inside surface 17 of face panel 12. The first position of tip 53 of collimator 52, is designated by the numeral 1. The design and position of lens 40, and the predetermined position of face panel 12 on support table 20 are chosen such that the paths of light rays through the aperture mask 14 strike the phosphor dots of one of the three sets thereof on the inner surface 17 of face panel 12. In a preferred embodiment, the apparatus is set up so that the light rays will land on the particular set of phosphor dots which was first developed on face panel 12. For example, if the set of blue phosphor dots were first developed on face panel 12, this same set of dots would be illuminated with collimator tip 53 in its initial position 1.

As light source moving means 60 moves enclosure 50 through a distance *d*, tip 53 of collimator 52 will move from its first position 1 to a second position designated by the numeral 2. This change in the position of collimator tip 53 causes the light rays which were initially registered on the first-developed set of phosphor dots on face panel 12 to be out of registry. Then as collimator tip 53 returns to its first position 1, the light rays will again be registered on the first-developed set of color phosphor dots. Light source moving means 60 may be designed to reciprocate enclosure 50 in a periodic recurrent manner so that this alternate registering and misregistering on the first-developed set of phosphor dots will be accomplished in a periodic manner. Any apparatus for accomplishing this reciprocating motion of enclosure 50, such as a motor driven cam arrangement, may be utilized as light source moving means 60.

As light rays from collimator tip 53 are alternately registered and misregistered on the first developed set of phosphor dots on face panel 12 a visual indication of the suitability of the mated aperture mask 14 and face panel 12 combination will appear on the tricolor phosphor screen located on inner surface 17 of face panel 12. For example, if aperture mask 14 has been mismated with face panel 12 in the manner described previously, a pattern of moving light and dark blotchy areas on the phosphor screen will signify to an operator that this mismating has taken place. The explanation for the occurrence of this visual indication is that an erroneously mated aperture mask will not permit the light rays to strike the first-developed set of phosphor dots on the face panel since it was not the aperture mask which was used in the initial exposure which produced the first-developed set of phosphor dots. The small variations in aperture mask configuration and positioning within face panels dictate that the same aperture mask used for exposing during the production of the phosphor screen on a particular face panel be mated with that face panel prior to its assembly into a completed picture tube. This fact is well-known to those familiar with the manufacture of color television picture tubes, and the apparatus of this invention provides a ready means for determining whether a particular aperture mask is properly mated with a particular face panel.

When aperture mask 14 has been properly mated with face panel 12 but has a dent or other deformity therein, a visual indication will be produced on the tricolor phosphor screen if this dent or other deformity was created subsequent to the production of the first-developed set of phosphor dots. The particular visual indication of such a dent or deformity in aperture mask 14 will be an alternating light and dark spot in the area of the phosphor screen corresponding to the location of the dent or deformity in aperture mask 14. The explanation for this alternating light and dark blotch is that the particular individual phosphor dots of the first-developed set of phosphor dots in the area of the screen illuminated through the deformed portion of the aperture mask 14 were developed on face panel 12 when the particular deformity did not exist. Consequently, some of the light rays passing through the deformed area of aperture mask 14, when collimator tip 53 is in its initial position 1, will not land on the first-developed phosphor dots in the corresponding area of the color phosphor screen. Then as collimator tip 53 is moved to a second position 2, some of the light rays will land on the first-developed phosphor dots through the dented area of the aperture mask at the same time that the other light rays are landing on the other phosphor dots of the first-developed set, causing an alternating dark and light area on the phosphor screen. The periodic occurrence of this registering and misregistering enables the ready detection of this visual indication on the phosphor screen of a dent or other deformity in the aperture mask.

It is to be understood that the above description is given by way of example only and is not intended to limit the scope of this invention. Thus, it is within the purview of this invention to provide motion of enclosure 50 in any other manner which would provide for movement of collimator tip 53 away from a first registered position 1 to any second misregistered position. The distance, direction, and period of this motion is limited only to the relative values thereof which would produce readily apparent indications of the type previously described. Moreover, this invention could also be practiced by providing for movement of lens 40, or support table 20, or face panel 12 itself in a periodic recurrent manner to produce the same visual indications described above. Thus, it is to be understood that numerous modifications could be made without departing from the spirit and scope of this invention as claimed.

The embodiments of the invention in which an exclusive property or privilege is claimed are defined as follows:

1. Apparatus for providing a visual indication of the suitability of a mated aperture mask and face panel combination for assembly into a finished color television picture tube, said aperture mask having normally been employed to produce a phosphor screen composed of different sets of color phosphor elements on said face panel, said apparatus comprising, in combination: first means supporting said mated aperture mask and face panel combination in a predetermined position; second means projecting a plurality of light rays along preset paths extending through said aperture mask and normally striking substantially all of said color phosphor elements in one of said sets thereof on said face panel; and third means altering said paths of said light rays with respect to said aperture mask in a predetermined recurrent manner to produce visual indications on said phosphor screen of the proper or improper mating of said aperture mask and face panel and of the presence or absence of undesirable deformities in said aperture mask.

2. Apparatus as claimed in claim 1, wherein said first means includes a panel support table and indexing means indexing said mated aperture mask and face panel combination in said predetermined position on said panel support table; said second means includes light means projecting a plurality of light rays from a small area and lens means intermediate said light means and said support table to direct said light rays along said preset paths; and said third means includes fourth means moving one of said mated aperture mask and face panel combination, said support table, said light means, and said lens means with respect to the others thereof in a predetermined recurrrent manner alternately to register and misregister said light rays on said color phosphor elements in said one of said sets thereof on said face panel, whereby a shifting pattern of dark and light blotches over all of said phosphor screen indicates an improper mating of said aperture mask and face panel and an alternating dark and light blotch in one particular area of said phosphor screen indicates the presence of an undesirable deformity in a corresponding area of said aperture mask.

3. Apparatus as claimed in claim 2, wherein said lens means includes a diverging lens and a lens holder, said lens holder fixing said lens in a preset position with respect to said indexing means; said light means includes a source of light rays and a collimator having a light diffusing tip with a small area, said tip being located initially in a first position with respect to said lens; and said fourth means comprises means moving said source of light rays and said collimator such that said tip moves alternately away from and back to said first position in a prearranged pattern and with a preset period.

4. Apparatus as claimed in claim 3, wherein said support table defines a plane; and said prearranged pattern includes a path from said first position to a second position, said path being perpendicular to said plane.

5. Apparatus as claimed in claim 4, wherein said second position is a preset distance further from said lens than said first position.

6. Apparatus as claimed in claim 5, wherein said preset distance and said preset period are chosen so that said visual indication on said phosphor screen of the presence of undesirable deformities in said aperture mask is readily apparent.

7. Apparatus for providing a visual indication of the suitability of a mated aperture mask and face panel combination for assembly into a finished color television picture tube, said aperture mask having normally been employed to produce a phosphor screen composed of at least a first and a second set of color phosphor elements on said face panel, said first and second sets of color phosphor elements having been produced on a one-at-a-time basis by a direct photographic process, said first set being produced first, said aperture mask being subject to fortuitous deformations subsequent to the production of said first set of color phosphor elements, said apparatus comprising, in combination: a panel support assembly including a panel support table defining a plane and indexing means indexing said mated aperture mask and face panel combination in a predetermined position on said panel support table; a light producing assembly including a source of light rays and a collimator, said collimator having a small light diffusing tip located initially in a first position to project a plurality of light rays toward said mated aperture mask and face panel combination; a lens assembly including a diverging lens and a lens holder, said lens having a predetermined configuration, said lens holder supporting said lens in a predetermined position intermediate said tip of said collimator and said support table; said first position of said tip, said predetermined configuration of said lens, and said predetermined position of said lens being chosen so that said light rays projected from said tip are directed by said lens into preset paths extending through said aperture mask and normally landing on substantially all of said color phosphor elements in said first set thereof; and means cyclically moving said light producing assembly in a pattern such that said tip of said collimator moves from said first position to a second position and back again to said first position during a preset period, said second position being a preset distance further from said lens on a path through said first position substantially perpendicular to said plane defined by said panel support table, said preset period and said preset distance being chosen to produce a readily apparent, shifting pattern of dark and light blotches over all of said phosphor screen when said aperture mask and face panel are improperly mated and to produce a readily apparent alternating dark and light blotch in one particular area of said phosphor screen when an undesirable deformity is present in a corresponding area of said aperture mask.

References Cited

UNITED STATES PATENTS

| | | | |
|---|---|---|---|
| 2,381,164 | 8/1945 | Hedin | 356—165 |
| 2,780,956 | 2/1957 | Fuller et al. | 356—165 |
| 2,817,276 | 12/1957 | Epstein et al. | 96—36.1 |
| 2,824,989 | 2/1958 | Christofferson. | |
| 3,222,172 | 12/1965 | Giuffrida | 96—36.1 |
| 3,264,932 | 8/1966 | Hendricks | 356—165 |

RONALD L. WIBERT, Primary Examiner

J. ROTHENBERG, Assistant Examiner

U.S. Cl. X.R.

250—62; 313—92; 316—28